US012729563B2

(12) United States Patent
Ho

(10) Patent No.: US 12,729,563 B2

(45) Date of Patent: Sep. 8, 2026

(54) ANTI-DETECTION COMBINATION LOCK

(71) Applicant: REAL LOCKS & SECURITY CO., LTD., New Taipei City (TW)

(72) Inventor: Hsi-Hao Ho, New Taipei City (TW)

(73) Assignee: REAL LOCKS & SECURITY CO., LTD., New Taipei City (TW)

(*) Notice: Subject to any disclaimer, the term of this patent is extended or adjusted under 35 U.S.C. 154(b) by 143 days.

(21) Appl. No.: 18/406,707

(22) Filed: Jan. 8, 2024

(65) Prior Publication Data

US 2025/0223836 A1 Jul. 10, 2025

(51) Int. Cl.

*E05B 37/00* (2006.01)

*E05B 37/12* (2006.01)

(52) U.S. Cl.

CPC .......... *E05B 37/0003* (2013.01); *E05B 37/12* (2013.01)

(58) Field of Classification Search

CPC ...... E05B 37/00; E05B 37/0003; E05B 37/12; Y10T 70/739; Y10T 70/7356; Y10T 70/7362

USPC ................................................ 70/333 R, 312

See application file for complete search history.

(56) References Cited

U.S. PATENT DOCUMENTS 825,735 A * 7/1906 Katzenberger ........ E05B 37/025 70/293

1,054,596 A * 2/1913 Molvig .................. E05B 37/12 70/323

1,119,527 A * 12/1914 Mueller ................ H01H 27/10 70/304

1,434,787 A * 11/1922 Mauldin ................ E05B 37/12 70/207

2,087,568 A * 7/1937 Destinay ................ E05B 37/12 70/293

2,621,508 A * 12/1952 Porche .................... E05B 37/12 70/309

2,766,610 A * 10/1956 Hirn ........................ E05B 37/08 70/333 R 3,416,337 A * 12/1968 Hutchins ................ E05B 37/12 70/284

3,473,353 A * 10/1969 Gerard .................... E05B 37/12 70/310

4,462,232 A * 7/1984 Yang ........................ E05B 37/12 70/312

4,719,777 A * 1/1988 Hwang .................. E05B 37/12 70/306

(Continued)

FOREIGN PATENT DOCUMENTS

DE 3929033 A1 * 11/1990 ............. E05B 37/12

DE 4122281 A1 * 11/1992 ............. E05B 37/12

(Continued)

*Primary Examiner* — Suzanne L Barrett

(74) *Attorney, Agent, or Firm* — HDLS IPR SERVICES; Chun-Ming Shih

(57) ABSTRACT

A combination lock is disclosed. A lock seat includes a base and a lock core, and numeral wheels are arranged spacedly on the base. Each numeral wheel includes a lower gear and an upper gear, and part of each lower gear protrudes from the base. An anti-detection piece includes a main rod and branch rods. Each branch rod is located on one side of each upper gear. A panel covers the base, and numeral holes and an opening are defined on the panel. A knob is arranged on one side of the anti-detection piece. The knob is connected to the lock core and protrudes from the opening.

6 Claims, 8 Drawing Sheets

(56) References Cited

U.S. PATENT DOCUMENTS

| | | | | | |
|---|---|---|---|---|---|
| 5,485,734 | A * | 1/1996 | Yang | E05B 37/0034 70/285 |
| 10,487,541 | B1 * | 11/2019 | Zhang | G07C 9/00666 |
| 10,851,563 | B1 * | 12/2020 | Zhang | E05B 37/12 |
| 2003/0205069 | A1 * | 11/2003 | Knoll | E05B 37/00 70/312 |
| 2023/0088900 | A1 * | 3/2023 | Ho | E05B 37/02 70/284 |
| 2024/0110408 | A1 * | 4/2024 | Zhang | E05B 47/0657 |

FOREIGN PATENT DOCUMENTS

| | | | | | |
|---|---|---|---|---|---|
| DE | 4343161 | A1 * | 6/1995 | E05B 37/12 |
| FR | 2719864 | A1 * | 11/1995 | E05B 37/12 |
| FR | 2724198 | A1 * | 3/1996 | E05B 37/12 |
| GB | 2268963 | A * | 1/1994 | E05B 37/12 |
| GB | 2269625 | A * | 2/1994 | E05B 37/12 |

* cited by examiner

ANTI-DETECTION COMBINATION LOCK

BACKGROUND OF THE DISCLOSURE

Technical Field

The technical field relates to a lock, and more particularly relates to a combination lock.

Description of Related Art

A combination lock is a mechanical lock that uses rotating numeral wheels to form a password. The use of a mechanic combination lock does not require power and does not rely on electronic components, making it suitable for installation in items with lower security requirements, such as cabinets or suitcases.

Additionally, the password of the combination lock is typically short and composed only of numbers. Consequently, it becomes susceptible to outsiders making educated guesses and learning the password through observation and analysis. A common technique for attempting to deduce the password involves manipulating the knob and aligning the numeral wheels simultaneously. In doing so, the lock may produce a distinct click sound when reaching the correct password number, which differs from other numbers. Therefore, the motivation of the applicant in this disclosure is to enhance the structure of the combination lock to prevent unauthorized individuals from deducing the correct password through observation and analysis.

In view of the above drawbacks, the inventor proposes this disclosure based on his expert knowledge and elaborate researches in order to solve the problems of related art.

SUMMARY OF THE DISCLOSURE

One object of this disclosure is to provide an anti-detection combination lock, which the knob is being rotated to push the anti-detection piece move toward the numeral wheels. As a result, the anti-detection piece abuts against each upper gear to prevent the lower gears from rotating, and that prevents the combination lock from being unlocked due to number detection.

This disclosure is a combination lock includes a lock seat, a plurality of numeral wheels, an anti-detection piece, a panel and a knob. The lock seat includes a base and a lock core installed on the base. The numeral wheels are arranged spacedly on the base. Each of the numeral wheels includes a lower gear and an upper gear arranged stacked coaxially, and part of a periphery of each lower gear protrudes from one side of the base. The anti-detection piece is arranged on the base and includes a main rod and a plurality of branch rods connected to the main rod. Each branch rod is located on one side of each upper gear correspondingly. The panel covers the base. A plurality of numeral holes and an opening are defined on the panel, and the numeral holes are disposed corresponding to the numeral wheels. The knob is arranged on one side of the anti-detection piece. The knob is connected to the lock core and protrudes from the opening. The knob is being rotated to push the anti-detection piece move toward the numeral wheels, so that the branch rods abut against each of the upper gears to prevent the lower gears from rotating.

In one embodiment of this disclosure, the base includes a positioning plate, a plurality of through holes are defined on the positioning plate, and each numeral wheel is disposed on each through hole.

In one embodiment of this disclosure, the anti-detection piece is structured in the shape of "±" (two horizontal lines combined with an I).

In one embodiment of this disclosure, each branch rod includes a latch portion located on a side thereof facing each upper gear, and each upper gear is pressed by the latch portion to be nonrotatable.

In one embodiment of this disclosure, the latch portion is a curved arc surface.

In one embodiment of this disclosure, the combination lock further includes a plurality of flexible rings, wherein each flexible ring encloses each upper gear.

In one embodiment of this disclosure, the flexible ring is pushed by the latch portion to press each upper gear.

In one embodiment of this disclosure, each flexible ring includes a pair of positioning posts, a plurality of perforations are defined on the positioning plate, and each flexible ring is positioned on the base through the pair of positioning posts inserted in the perforations.

In one embodiment of this disclosure, the flexible ring includes a pair of lugs, and the pair of positioning posts are arranged on the pair of lugs.

In one embodiment of this disclosure, one of the pair of lugs abuts against the anti-detection piece, and another one of the pair of lugs abuts against the positioning plate.

In one embodiment of this disclosure, the flexible ring includes a plurality of teeth, and the teeth abut against two sides of the upper gear opposite to each other.

In one embodiment of this disclosure, the positioning plate includes a plurality of positioning ribs on both sides thereof, and one side of the flexible ring abuts against the positioning ribs.

In one embodiment of this disclosure, the panel includes a plurality of positioning posts on an inner wall thereof facing the numeral wheels, and the positioning posts are inserted in the numeral wheels.

In one embodiment of this disclosure, the panel includes a center column on an inner wall thereof facing the numeral wheels, and the center column passes through the positioning plate and the anti-detection piece.

In comparison with the related art, the combination lock in this disclosure is disposed with an anti-detection piece on one side of the numeral wheels. When the knob is being rotated, it pushes the anti-detection piece move toward the numeral wheels. Thus, the anti-detection piece abuts against each upper gear to prevent the lower gear from rotating. Furthermore, the numeral wheel in this disclosure includes a lower gear and an upper gear arranged stacked coaxially. When the upper gear is obstructed by the anti-detection piece, the lower gear is also prevented from rotating. Therefore, the numeral wheels are unable to perform the number detection operation. Therefore, the safety and practicality of this disclosure are increased.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
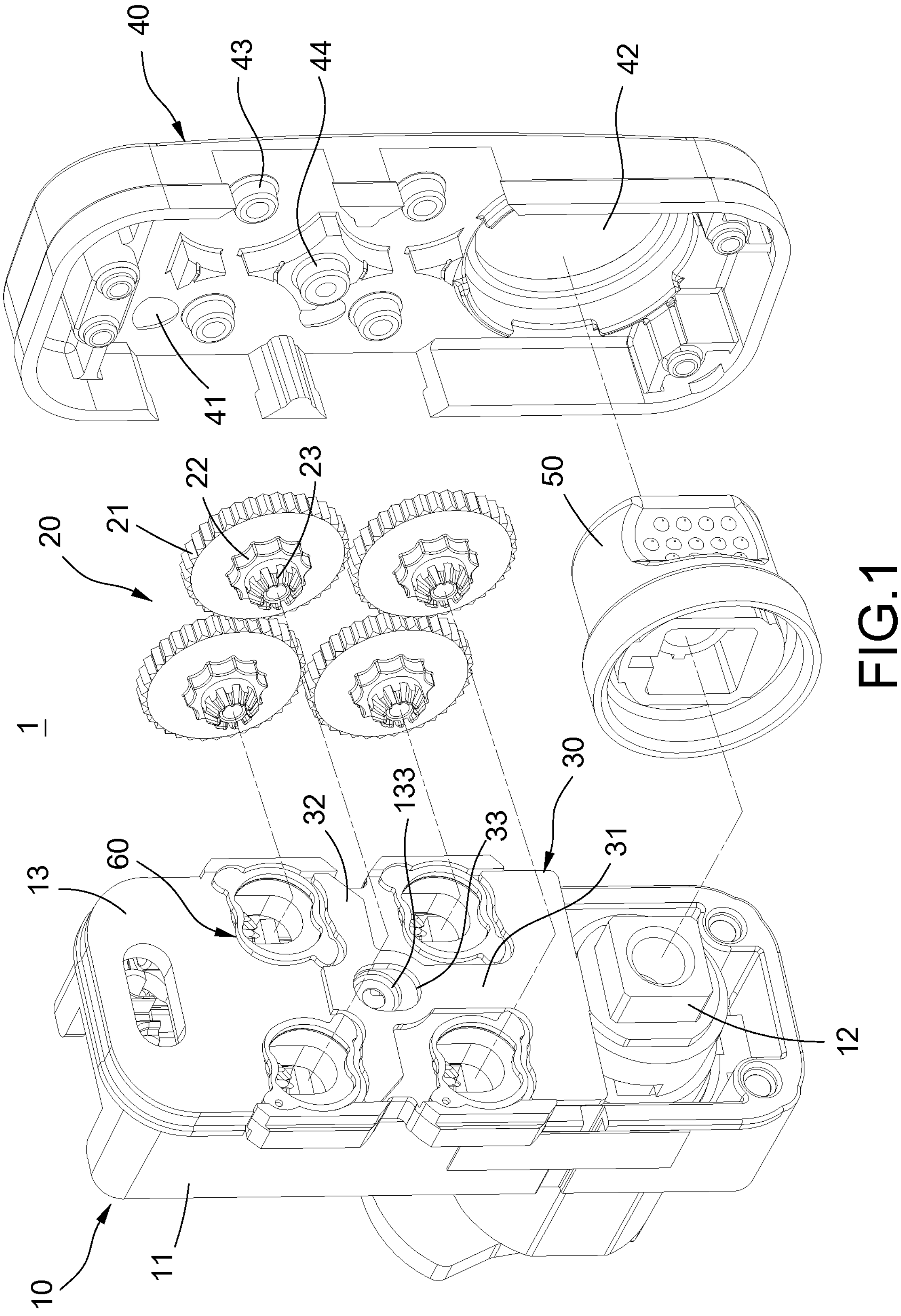
FIG. 1 illustrates a perspective exploded schematic view of the anti-detection combination lock in this disclosure.
Figure 2:
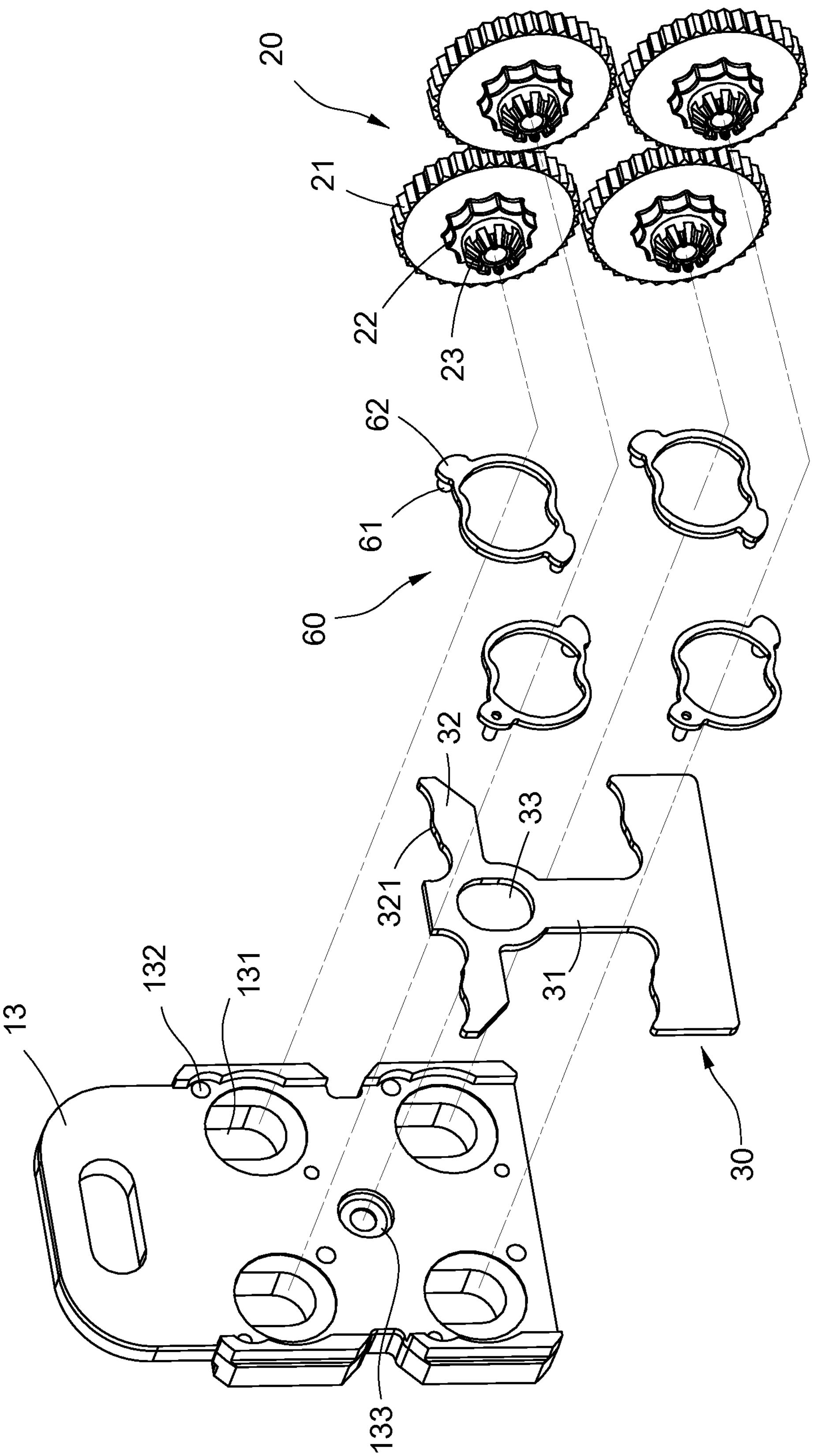
FIG. 2 illustrates a partially exploded perspective schematic view of the anti-detection combination lock in this disclosure.

Please refer to FIG. 1 and FIG. 2, which depict a perspective exploded schematic view and a partially exploded perspective schematic view of the anti-detection combination lock in this disclosure. This disclosure is an anti-detection combination lock 1 that includes a lock seat 10, a plurality of numeral wheels 20, an anti-detection piece 30, a panel 40 and a knob 50. The numeral wheels 20, the anti-detection piece 30 and the knob 50 are arranged on the lock seat 10. The panel 40 is combined to the lock seat 10. The panel 40 covers the anti-detection piece 30, and parts of the numeral wheels 20 and the knob 50 are exposed from the panel 40 to facilitate rotation for unlocking. More detailed of the combination lock 1 is described as follow.

The lock seat 10 includes a base 11 and a lock core 12 installed on the base 11. The numeral wheels 20 are arranged spacedly on the base 10. Each of the numeral wheels 20 includes a lower gear 21 and an upper gear 22 stacked coaxially. Part of the periphery of each lower gear 21 protrudes from one side of the base 10 for users to rotate. Additionally, each numeral wheel 20 includes a driving gear 23 stacked on the upper gear 22. The driving gear 23 is used to drive the lock core.

The anti-detection piece 30 is arranged on the base 11 and includes a main rod 31 and a plurality of branch rods 32 connected to the main rod 31. In this embodiment, the anti-detection piece 30 is structured in a shape of "±" (two horizontal lines combined with an I).

Moreover, each branch rod 32 includes a latch portion 321 located on a side thereof facing each upper gear 22. Specifically, the latch portion 321 is, but not limited to, a curved arc surface.

Moreover, the panel 40 covers the base 11. A plurality of numeral holes 41 and an opening 42 are defined on the panel 40, and the numeral holes 41 are disposed corresponding to the numeral wheels 20. The knob 50 is arranged on one side of the anti-detection piece 30. The knob 50 is connected to the lock core 12 and protrudes from the opening 42.

In one embodiment of this disclosure, the base 11 includes a positioning plate 13. A plurality of through holes 131 are defined on the positioning plate 13. Each numeral wheel 20 is disposed on each through hole 131.

It should be noted that the panel 40 includes a plurality of positioning posts 43 on an inner wall thereof facing the numeral wheels 20. The positioning posts 43 are inserted in the numeral wheels 20 for positioning the numeral wheels 20.

Furthermore, the panel 40 further includes a center column 44 disposed on an inner wall thereof facing the numeral wheels 20. The positioning plate 13 is provided with a through slot 133 located between the through holes 131. The anti-detection piece 30 is provided with a long slot 33 disposed between the branch rods 32. The center column 44 passes through both the through slot 133 of the positioning plate 13 and the long slot 33 of the anti-detection piece 30, thereby positioning the positioning plate 13 and the anti-detection piece 30 between the lock seat 10 and the panel 40.

Figure 3:
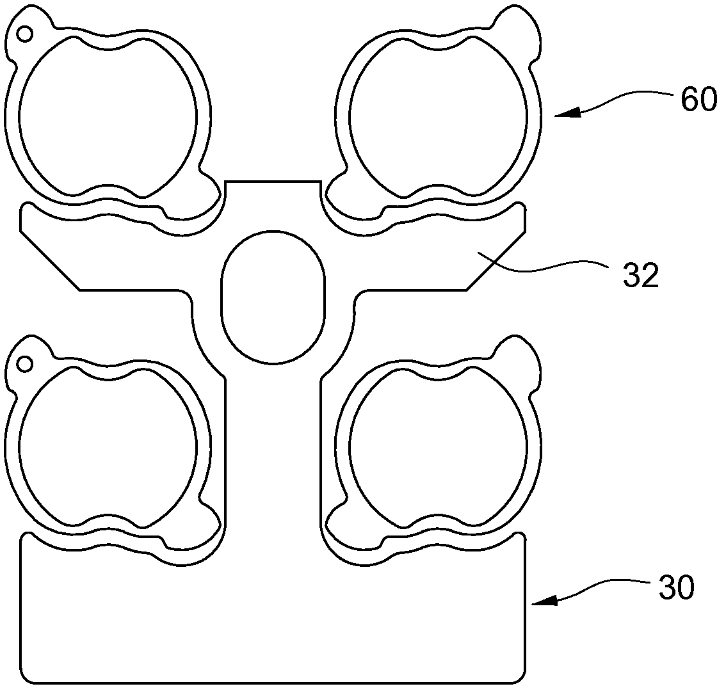
FIG. 3 illustrates a schematic plan view of flexible ring and anti-detection piece in this disclosure.
Figure 4:
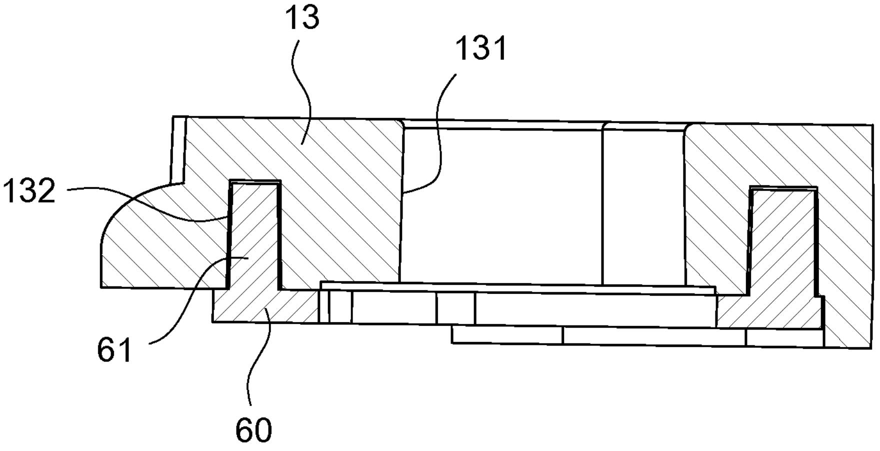
FIG. 4 illustrates a cross-sectional view of the combination of the flexible ring and the positioning plate in this disclosure.

Please further refer to FIG. 3 and FIG. 4, which depict a schematic plan view of flexible ring and anti-detection piece in this disclosure and a cross-sectional view of the combination of the flexible ring and the positioning plate in this disclosure. The combination lock 1 of this disclosure further includes a plurality of flexible rings 60. The flexible rings 60 are located on one side of each branch rod 32 of the anti-detection piece 30. Additionally, each flexible ring 60 is made of flexible material such as rubber and encloses each upper gear 22.

In this embodiment, each flexible ring 60 includes a pair of positioning posts 61 and a pair of lugs 62 (also refer to FIG. 2). The pair of positioning posts 61 are arranged on the pair of lugs 62. Moreover, a plurality of perforations 132 are defined on the positioning plate 13 of the base 11. Each flexible ring 60 is combined with the positioning plate 13 and positioned on the base 11 through the pair of positioning posts 61 inserted in the perforations 132.

Figure 5:
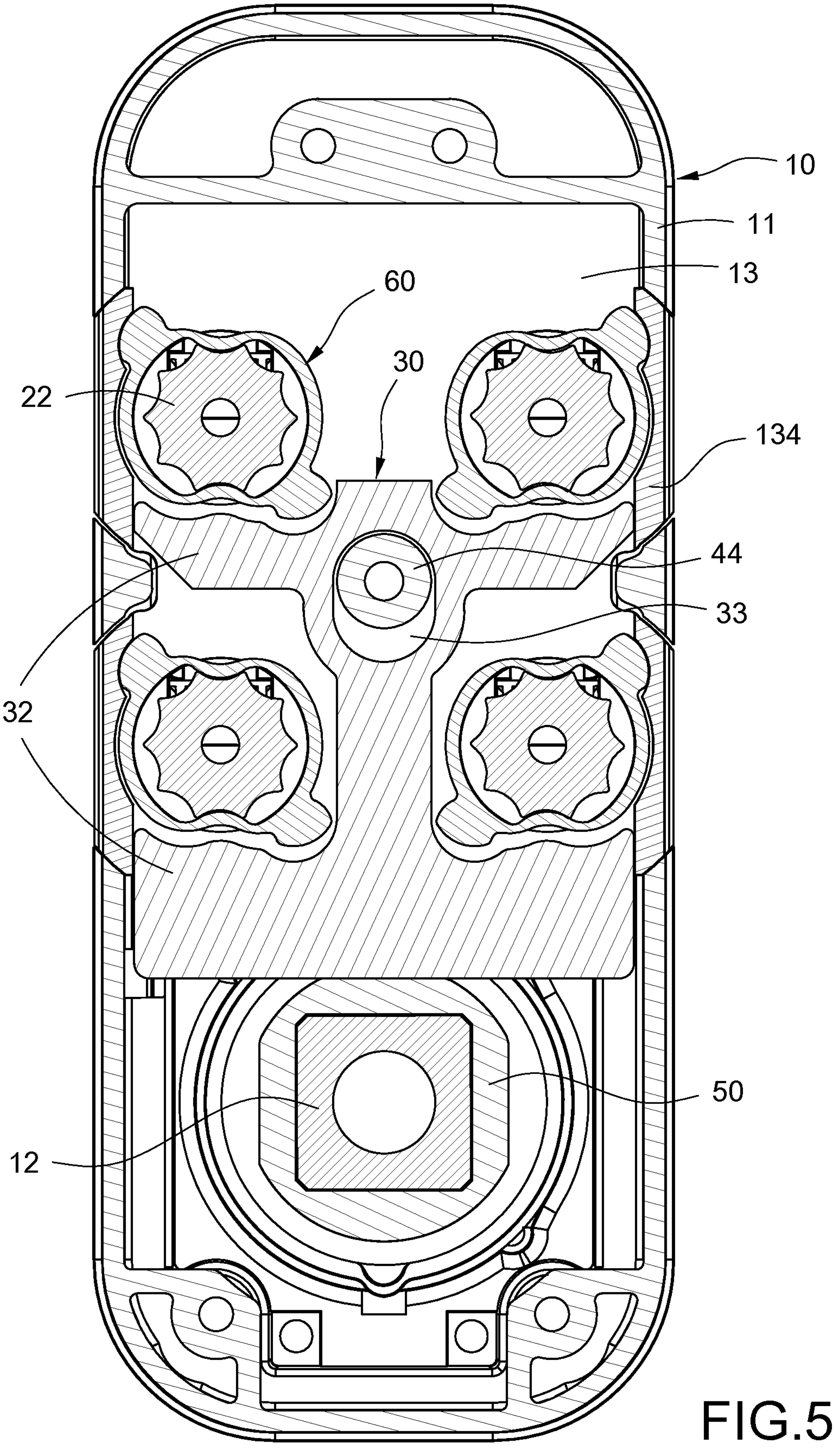
FIG. 5 illustrates a cross-sectional view of the anti-detection combination lock in this disclosure.

Please further refer to FIG. 5, which is a cross-sectional view of the anti-detection combination lock in this disclosure. The anti-detection piece 30 is arranged on the positioning plate 13, and the central column 44 is inserted in the long slot 33. Moreover, the anti-detection piece 30 is constrained by the central column 44 and may move up and down along the long slot 33. The numeral wheels 20 are arranged spacedly on one side of the branch rods 32. Additionally, the flexible rings 60 enclose each upper gear 22 respectively, and one side of each flexible ring 60 is located between the branch rod 32 and the upper gear 22. Furthermore, the knob 50 is located on one side of the anti-detection piece 30.

It is worth of noticing that the positioning plate 13 includes a plurality of positioning ribs 134 on both sides thereof, and one side of the flexible rings 60 abut against the positioning ribs 134.

Figure 6:
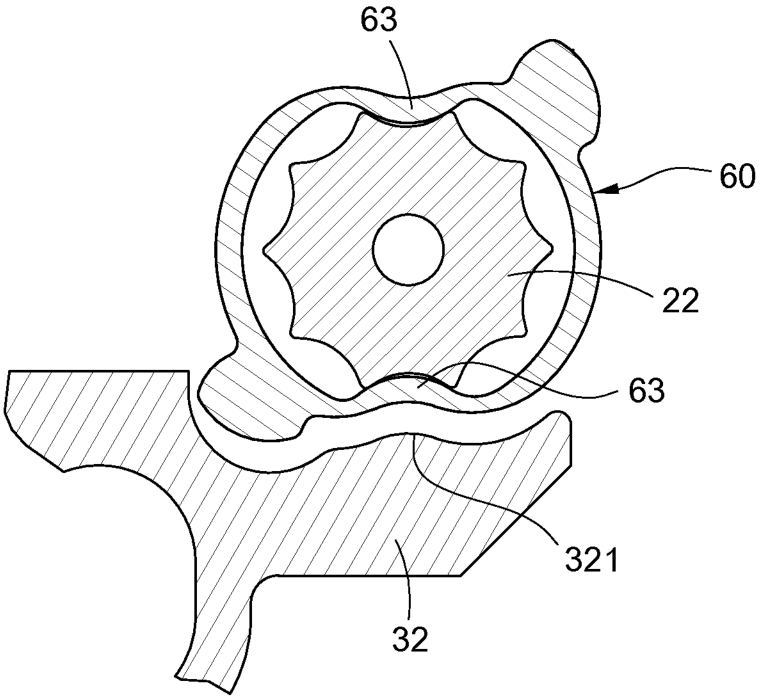
FIG. 6 illustrates a schematic plan view of the upper gear and the anti-detection piece in this disclosure.
Figure 7:
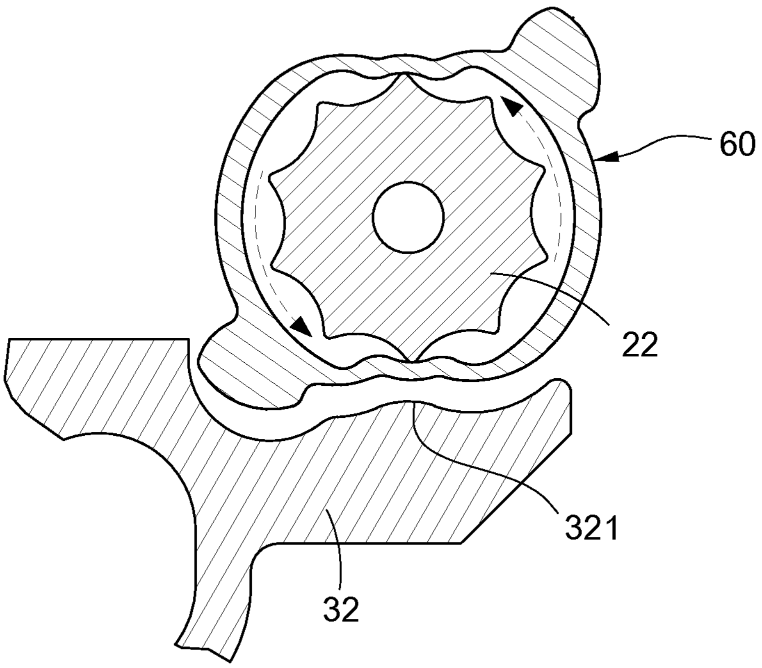
FIG. 7 illustrates a schematic view of the rotation of the upper gear in this disclosure.

Please refer to FIG. 6 and FIG. 7, which depict a schematic plan view of the upper gear and the anti-detection piece in this disclosure and a schematic view of the rotation of the upper gear in this disclosure. As shown in FIG. 6, the arrangement of the flexible ring 60 in this disclosure is used for positioning when the upper gear 22 rotates. The flexible ring 60 includes a plurality of protrusions 63. The protrusions 63 are located on the side thereof facing the upper gear 22 and abut against two sides of the upper gear 22 opposite to each other. Accordingly, when the upper gear 22 rotates to the position of each number, the protrusions 63 of the flexible ring 60 may stop and abut against two sides of the upper gear 22 opposite to each other, providing a positioning effect for each numeral wheel 20 when it rotates to the position of each number.

Please refer to FIG. 6, when the knob 50 is not rotating, the branch rod 32 of the anti-detection piece 30 does not contact the flexible ring 60, and the latch portion 321 of the branch rod 32 may not abut against the upper gear 22. Then, the numeral wheels 20 may rotate freely.

Figure 8:
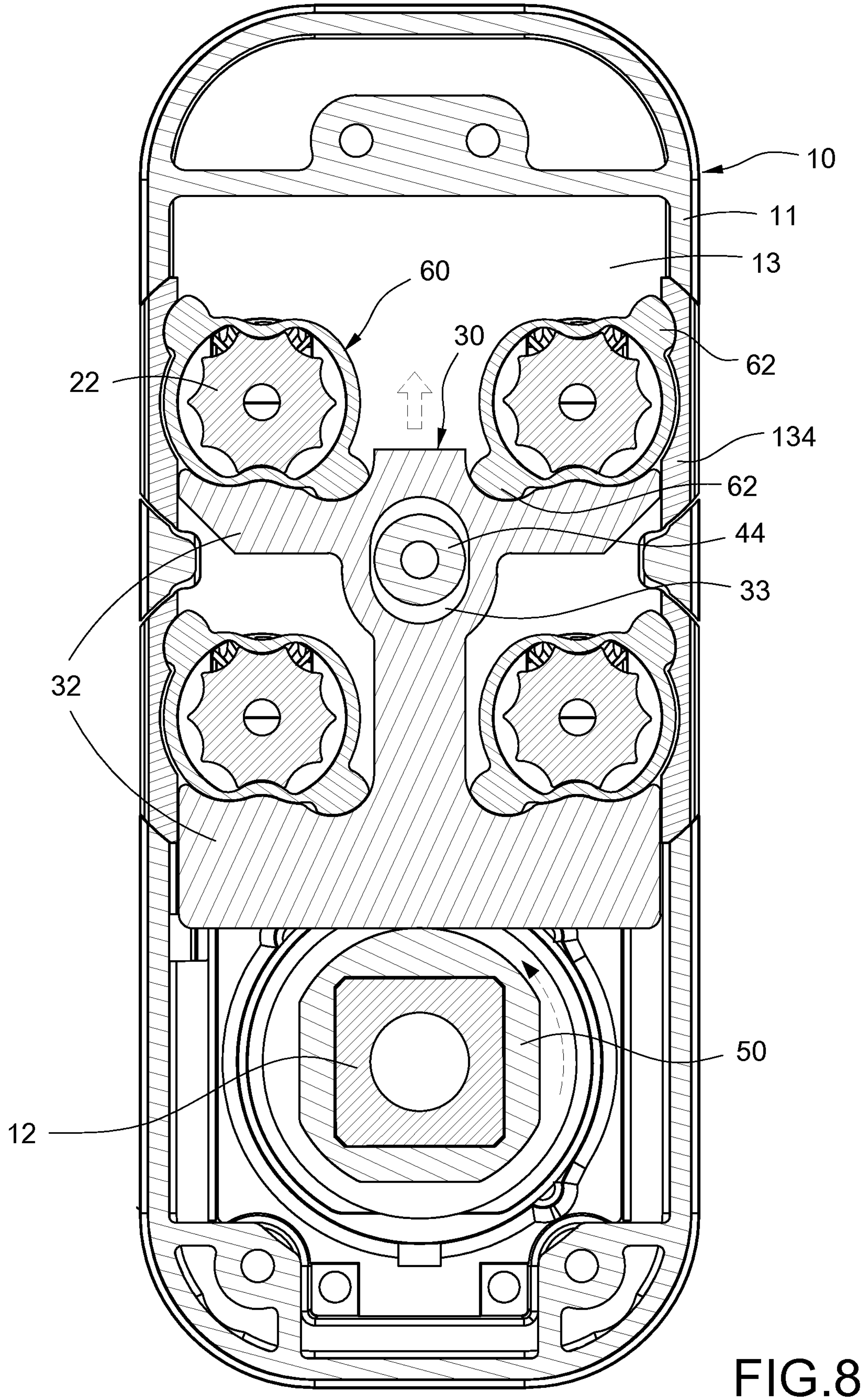
FIG. 8 illustrates an operation schematic view of the anti-detection combination lock in this disclosure.
Figure 9:
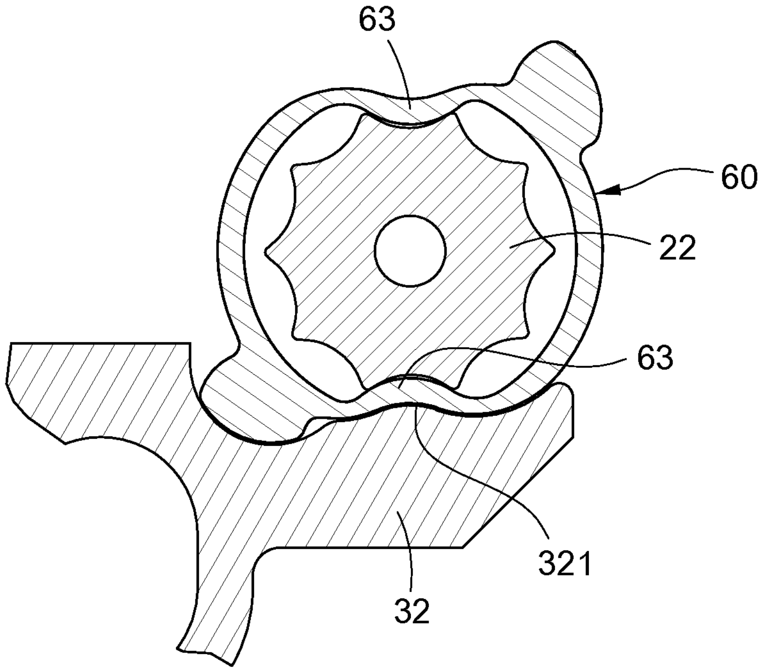
FIG. 9 illustrates a schematic plan view of the anti-detection piece abutting against the upper gear in this disclosure.

Please further to FIG. 8 and FIG. 9, which illustrate an operation schematic view of the anti-detection combination lock in this disclosure and a schematic plan view of the upper gear abutting against the anti-detection piece in this disclosure. After the knob 50 of the combination lock 1 is being rotated, one side of the knob 50 pushes the anti-detection piece 30 move toward the numeral wheels 20. Then, the branch rods 32 abut against each of the upper gears 22. Each upper gear 22 is pressed by the latch portion 321 and may not rotate to further prevent each number wheel 20 (the lower gear 21) from rotating. Thus, the detecting action of the combination lock 1 may not be performed.

It is worth noticing that each flexible ring 60 (protrusion 63) is also pushed by the latch portion 321 to press each upper gear 22. Additionally, one of the pair of lugs 62 abuts against the anti-detection piece 30, and another one of the pair of lugs 62 abuts against the positioning ribs 134 of the positioning plate 13.

Figure 10:
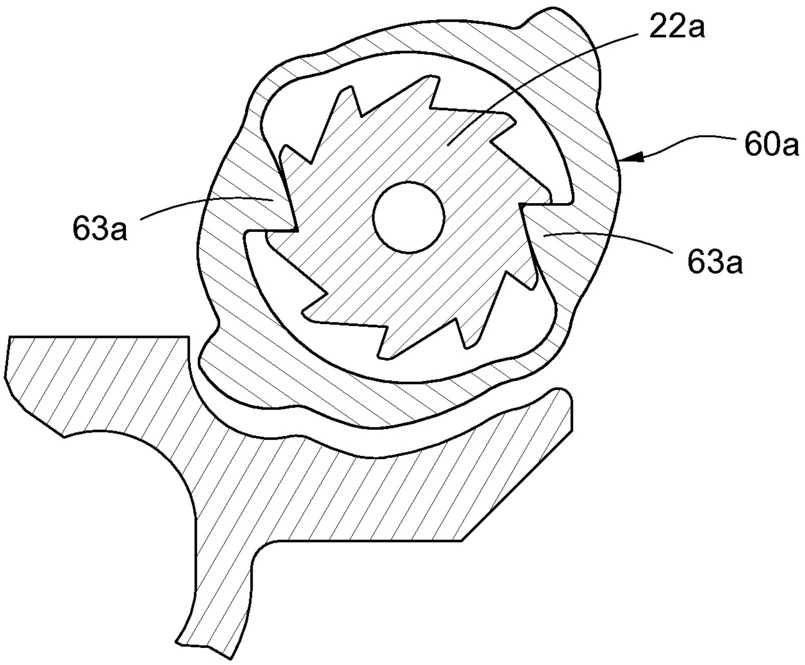
FIG. 10 illustrates a schematic plan view of another embodiment of the upper gear and the flexible ring in this disclosure.

Please further refer to FIG. 10, which depicts a schematic plan view of another embodiment of the upper gear and the flexible ring in this disclosure. In this embodiment, the upper gear 22*a* is configured as a ratchet. Furthermore, the flexible ring 60*a* encloses the upper gear 22*a*. The flexible ring 60*a* includes a plurality of protrusions 63*a*. The protrusions 63*a* of the flexible ring 60*a* are located on the side thereof facing the upper gear 22*a* and abut against two sides of the upper gear 22*a* opposite to each other. In this embodiment, each protrusion 63*a* is configured as a tooth.

Figure 11:
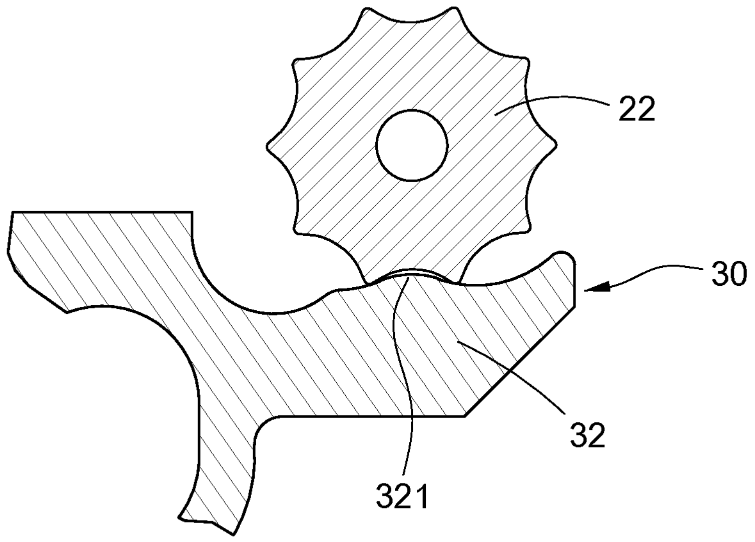
FIG. 11 illustrates a schematic plan view of another embodiment of the upper gear and the anti-detection piece in this disclosure.

Please refer to FIG. 11, which illustrates a schematic plan view of another embodiment of the upper gear and the anti-detection piece in this disclosure. The difference of this embodiment is the absence of a flexible ring arranged between the upper gear 22 and the anti-detection piece 30. Instead, the branch rod 32 (latch portion 321) of the anti-detection piece 30 directly presses the upper gear 22 to prevent it from rotating. In some embodiments, the positioning of the rotation of the upper gear 22 may be achieved through other structures such as pawls or balls.

While this disclosure has been described by means of specific embodiments, numerous modifications and variations could be made thereto by those skilled in the art without departing from the scope and spirit of this disclosure set forth in the claims.

What is claimed is:

1. An anti-detection combination lock, comprising:

a lock seat, comprising a base and a lock core installed on the base;

a plurality of numeral wheels, arranged spacedly on the base, each numeral wheel comprising a lower gear and an upper gear stacked coaxially, and part of a periphery of the lower gear protruding from one side of the base;

an anti-detection piece, arranged on the base, comprising a main rod and a plurality of branch rods connected to the main rod, and each branch rod located on one side of each upper gear;

a panel, covering the base, a plurality of numeral holes and an opening defined on the panel, and the numeral holes disposed corresponding to the numeral wheels; and a knob, arranged on one side of the anti-detection piece, connected to the lock core and protruding from the opening;

a plurality of flexible rings, wherein each flexible ring encloses each upper gear;

wherein the knob is being rotated to push the anti-detection piece to move toward the numeral wheels to make the branch rods abut against each upper gear to make a plurality of lower gears be nonrotatable;

wherein the base comprises a positioning plate, a plurality of through holes are defined on the positioning plate, and each numeral wheel is disposed on each through hole;

wherein each branch rod comprises a latch portion located on a side thereof facing each upper gear, and each upper gear is pressed by the latch portion to be nonrotatable.

2. The combination lock according to claim 1, wherein each flexible ring is pushed by the latch portion to press each upper gear; each flexible ring comprises a pair of positioning posts, a plurality of perforations are defined on the positioning plate, and each flexible ring is positioned on the base through the pair of positioning posts being inserted in the perforations.

3. The combination lock according to claim 2, wherein each flexible ring comprises a pair of lugs, and the pair of positioning posts are arranged on the pair of lugs; one of the pair of lugs abuts against the anti-detection piece, and another one of the pair of lugs abuts against the positioning plate.

4. The combination lock according to claim 2, wherein each flexible ring comprises a plurality of teeth, and the teeth abut against two sides of the upper gear opposite to each other; the positioning plate comprises a plurality of positioning ribs disposed on two sides thereof, and one side of the flexible rings abuts against the positioning ribs.

5. The combination lock according to claim 1, wherein the panel comprises a plurality of positioning posts disposed on an inner wall thereof facing the numeral wheels, and the positioning posts are inserted in the numeral wheels.

6. The combination lock according to claim 5, wherein the panel comprises a center column disposed on an inner wall thereof facing the numeral wheels, and the center column passes through the positioning plate and the anti-detection piece.

* * * * *